Jan. 3, 1928.

C. S. MUIR 1,654,991

PUZZLE OR TOY

Filed Aug. 19, 1926

Charles S. Muir, Inventor

By Vernon E. Hodges, Attorney

Jan. 3, 1928.

C. S. MUIR 1,654,991

PUZZLE OR TOY

Filed Aug. 19, 1926    2 Sheets-Sheet 2

Inventor
Charles S. Muir
By Vernon C. Hodges
Attorney

Patented Jan. 3, 1928.

1,654,991

UNITED STATES PATENT OFFICE.

CHARLES S. MUIR, OF CHEVY CHASE, MARYLAND.

PUZZLE OR TOY.

Application filed August 19, 1926. Serial No. 130,246.

My invention relates to an improvement in puzzles or toys.

The object is to provide a device of the character indicated which will be educational as well as amusing and entertaining, and one which will at the same time test the skill of the player. The device is educational in that it will teach facts about the planetary system, such, for instance, as the fact now generally conceded that all of the planets originated in, and have been spun off from, a central sun. A further object is to indicate the relative sizes and distances of these planets from the central sun.

The invention in its present form comprises a shallow box having a relatively large depression at or near the center, surrounded by other depressions of varying sizes and distances therefrom arranged to measure the relative distances and sizes of the planets in a solar system, these depressions being differently colored, and the planets represented by correspondingly colored and sized movable objects, such as balls or marbles, which are started from the central depression and adapted to be rolled into their corresponding depressions by the skillful manipulation of the device by the one who plays the game.

Besides the above, the game or puzzle may have printed on it important facts of astronomy, such as the distances of the planets from the sun, their orbits, etc.

Figure 1:
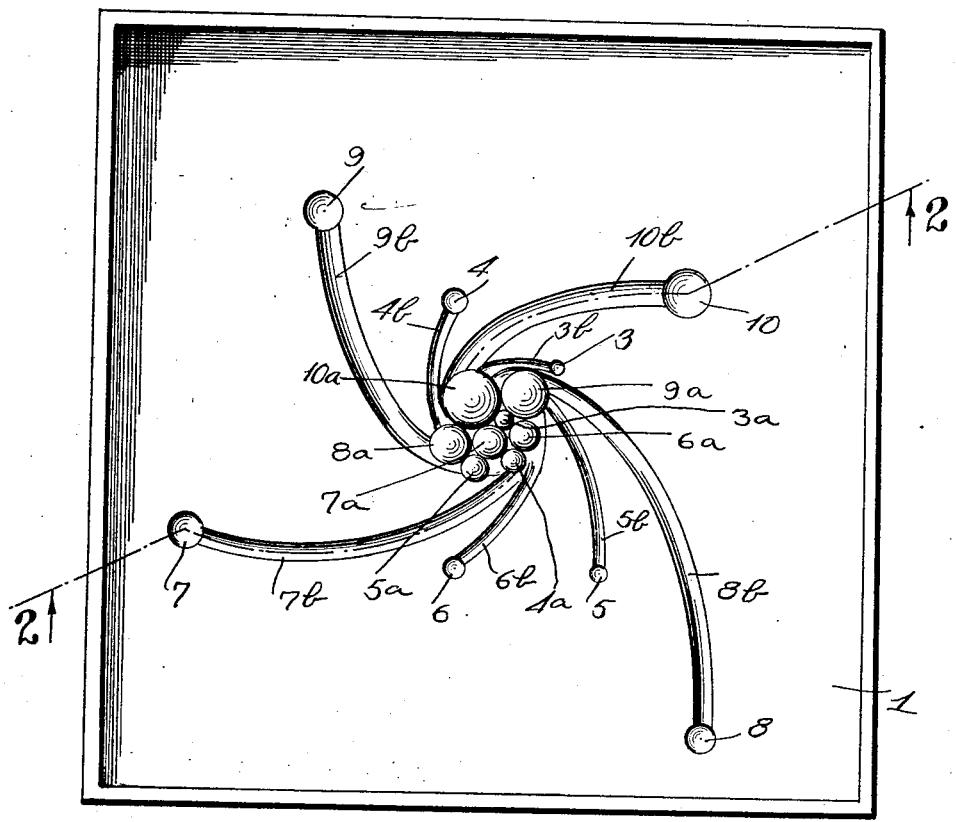
Fig. 1 is a plan view showing the game or puzzle at the start.
Figure 2:
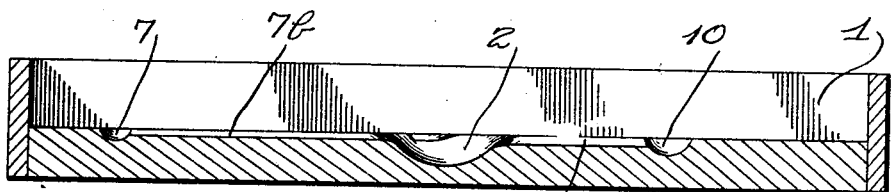
Fig. 2 is a section on line 2—2 of Fig. 1, looking in the direction of the arrows.
Figure 3:
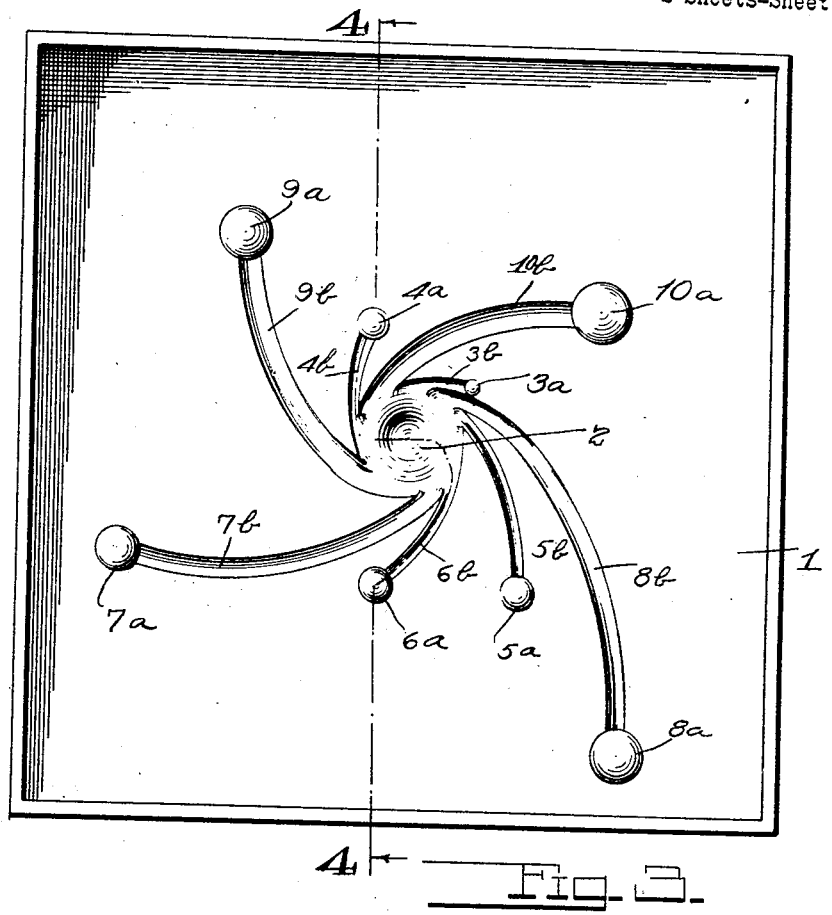
Fig. 3 is a plan view showing the game or puzzle after the game has been completed and the movable objects have been located in their respective depresions or pockets.
Figure 4:
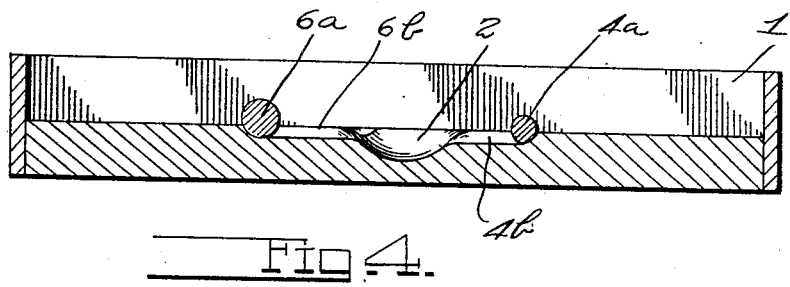
Fig. 4 is a section on line 4—4 of Fig. 3 looking in the direction of the arrows.

The numeral 1 represents a box, preferably shallow, and made of any suitable material, and which may be covered with glass, if desired, in order to keep the movable objects from being lost.

In the center, there is a relatively deep depression 2, which represents the position of the sun; and the depressions in the order of their sizes are indicated by the numerals 3, 4, 5, 6, 7, 8, 9 and 10, and these represent the positions and relative sizes of the planets in the following order:—Mercury, Venus, Mars, the earth, Uranus, Neptune, Saturn and Jupiter.

These recesses will be colored differently, and the movable objects (such as balls or marbles) are correspondingly colored, and these are indicated by the numerals $3^a$, $4^a$, $5^a$, $6^a$, $7^a$, $8^a$, $9^a$, and $10^a$, in order to show their correspondence with the recesses that bear these numerals. These several recesses are connected by grooves, preferably curved, indicated by numerals $3^b$, $4^b$, $5^b$, $6^b$, $7^b$, $8^b$, $9^b$, and $10^b$, extending from the outer recesses to the center recess 2. These are curved to indicate the centrifugal action and the course of the planets as they are thrown from the sun.

In playing the game, the several movable objects, one for each of these planets, are placed in the central recess 2, that is to say at the sun, and when all together represent the sun, and the player by skillfully turning and tipping the device is able to direct the course of the various objects representing the planets $3^a$ to $10^a$ to their respective depressions, thus completing the game.

By means of this game or puzzle, children are taught facts about the planetary system, such for example as the fact that the planets originated and were spun off from a central sun, the relative sizes of these planets, and their distance from the central sun. Thus in a very simple and inexpensive way the child is taught these facts while being interested and amused.

I claim:

1. A device of the character described including a base having a plurality of depressions located at predetermined distances from a central depression, and movable objects adapted to be directed into their predetermined depressions, these various depressions arranged at distances from the central depression to correspond somewhat with the distances of various planets from their sun, and of different sizes somewhat to correspond to the relative sizes of the various planets.

2. A device of the character described including a base having a plurality of depressions located at predetermined distances from a central depression, movable objects adapted to be directed into their predetermined depressions, these various depressions arranged at distances from the central depression to correspond somewhat with the distances of various planets from their sun, and of different sizes somewhat to correspond to the relative sizes of the various planets, and grooves connecting the outer depressions with the central depression.

3. A device of the character described including a base having a plurality of depressions arranged about a central depression and connected thereto by grooves, said grooves being curved substantially throughout the lengths thereof, and being substantially tangent to said central depression.

4. A device of the character described including a base having a plurality of depressions located at predetermined distances from a central depression, said plurality of depressions being of different sizes from each other, and movable objects of different sizes corresponding with the different sized depressions adapted to be directed into the different sized depressions.

5. A device of the character described including a base having a plurality of depressions located at predetermined distances from a central depression and communication therewith by longitudinal grooves, curved substantially throughout the lengths thereof, said plurality of depressions being arranged at distances from the central depressions substantially corresponding with the distances of the various planets from the sun, and being of different sizes to substantially correspond with the relative sizes of the planets, and movable objects of varying sizes corresponding with the respective depressions and adapted to be directed thereinto.

In testimony whereof I affix my signature.

CHARLES S. MUIR.